March 26, 1935.    A. J. DENISTON, JR    1,995,706
NAIL
Filed April 21, 1933
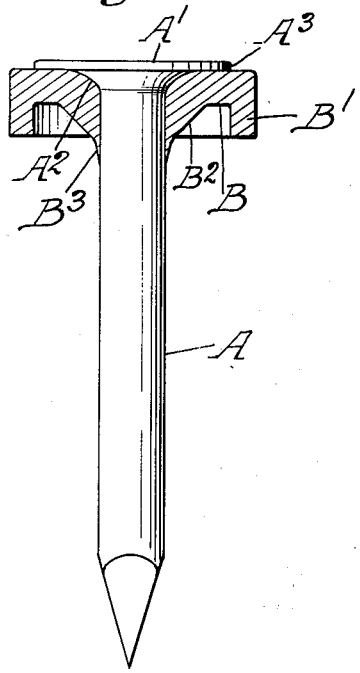
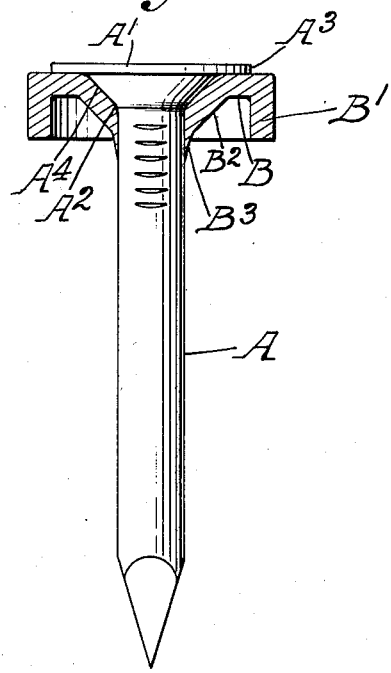
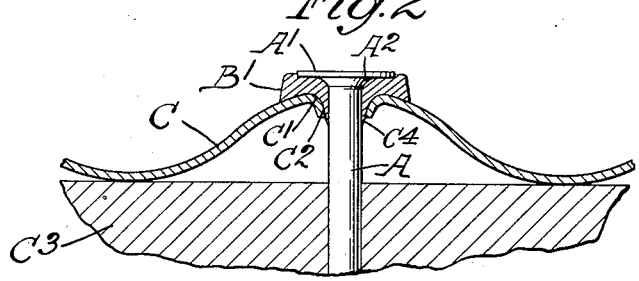
Inventor
Albert J. Deniston Jr.
by Parker + Carter.
Attorneys Patented Mar. 26, 1935

1,995,706

UNITED STATES PATENT OFFICE 1,995,706

NAIL

Albert J. Deniston, Jr., Chicago, Ill.

Application April 21, 1933, Serial No. 667,171

2 Claims. (Cl. 85—28)

This invention relates to the construction of roofs and walls and to a means for fastening roofing or wall members in place.

It has for one object to provide a roof covering formed of sheets of material, preferably corrugated, and held in place upon purlins or other structural members by means of fastening nails which penetrate the roofing and enter the structural member.

Another object is to provide in connection with the fastening nail a sealing means so that the hole formed by the nail is sealed and made water tight. Another object is to provide means in connection with the nail for protecting the area about the hole to prevent infiltration of water, and, if the roofing member is of metal, to prevent rusting or corrosion in the area about the hole.

Other objects will appear from time to time in the specification and claims.

In one form shown, the structure is formed of a purlin or other structural member to which corrugated metallic sheeting is applied. This may, of course, be for a wall or a roof or any other enclosing or partitioning member. Such structures are commonly used as roofs and for exterior walls and the necessity of preventing leakage through the hole made by the nail and for preventing rust or other corrosion of the metal sheet member is important.

In the arrangement shown, the nail, which may itself be of almost any suitable form, is provided with a driving head and with a sealing head, the two preferably formed together so that they have the appearance of a single head. The driving head is preferably made integral with the body of the nail and the sealing head is of a softer material and is positioned about the shank of the nail and about and largely beneath the driving head of the nail. The sealing head is of such shape that when the nail is driven and it comes in contact with the metallic sheathing material, a portion of the sealing head penetrates into the hole through the sheathing and seals it at that point and another portion of the sealing head contacts the sheathing and makes a sealing contact with it to protect an area about the hole which is considerably greater than the area of the hole so that there are thus made two seals, an inner seal at and within the hole, and an outer seal away from the hole. In some forms these two seals will be separate and there will be an unsealed, annular space between them. In other forms they will not be separate and substantially the entire area of the head of the nail will be sealed in contact with the sheathing.

My invention is illustrated more or less diagrammatically in the accompanying drawing, wherein:—

Figure 1 is a longitudinal section of a nail, showing one form of my sealing head;

Figure 2 is a sectional view through the sheathing and structural member, showing a nail in place;

Figure 3 is a sectional view similar to Figure 1, showing a modified form of nail.

Like parts are designated by like characters throughout the specification and drawing.

A indicates the shank of a nail. $A^1$ is the driving head of the nail. The two are preferably made integral and at the point where they join there is a curved or flattened fillet $A^2$. The sealing head, which may be of lead and should be of some metal softer than that of the nail, is positioned about and largely beneath the head of the nail and is positioned so that the nail head protrudes or extends above it, as at $A^3$.

The lead head is formed of a generally flat portion B lying beneath the nail head. At or near its outer edge it has a downwardly depending skirt $B^1$. Towards its center it is provided with an inclined, downwardly extending portion $B^2$ which joins a narrow and relatively thin portion $B^3$ which merges with the shank of the nail.

In Figure 2 the nail of Figure 1 is shown in driven position wherein the sheathing member C and the driving head $A^1$ of the nail have cooperated to cause flow of the metal of the sealing head and distortion of the apron $B^1$ thereof to effect a substantially perfect seal between the nail head and sheating member from the shank outwardly to the rim of the apron. When so driven into position the head $A^1$ has sunk largely into the lead head. This will not always occur but in ordinary practice, after the nail has been driven home, the upper surface of the lead head and the driving head may be substantially the same. As shown, a portion of the sheathing C has curled or been forced inwardly about the hole as at $C^1$ and there has thus been formed a tapered or funnel-like depression $C^2$ into which the metal of the portions $B^2$ and $B^3$ of the lead head have been forced so that this portion of the lead head fills and seals the perforation through the sheathing. The skirt portion $B^1$ is shown as resting against and making sealing contact with the sheathing at a point away from the hole so that this area is also covered and sealed. This feature is of particular importance when galvanized sheathing is used because in making the hole or driving the nail, the bending of the metal may crack away some of the galvanizing and it is important that this area be protected from rusting and corrosion and this result is accomplished as shown in Figure 2. The nail projecting into the purlin or other structural member C³ holds the sheathing in position.

The shape of the under side of the sealing cap has been described as made up of the generally flat portion B and the angular or inclined parts B² and B³. Instead of being formed in this manner, with the angularly disposed and relatively flattened portions, the under surface of the sealing head might be formed in a sweeping curve to correspond to the shape of the nail or driving head. Actually, as shown in the drawing with the angular portions, the effect is generally the same as that of a sweeping curve and with either arrangement of the under surface of the sealing head, the thickness of the lead may be made substantially uniform so that except for the thinner tapered portion B³ there is a substantially uniform thickness of sealing material beneath the driving head and this material in shape corresponds to the contour of the driving head, with the exception, of course, that the sealing head is provided with the additional downwardly depending skirt and with the further exception that the sealing head preferably extends laterally beyond the outer edges of the driving head.

In Figure 3 a further modification is shown, the nail itself being formed with an additional angular portion A⁴ under the head and between the flat portion of the head and the curved or inclined fillet A². Thus the nail proper, as distinguished from the sealing head portion, is given the enlarged and inclined portion A⁴ which has an inclination of 45° with respect to the axis of the shank of the nail and this same inclination is preserved in that portion of the sealing head which tapers down to the shank so that the thickness of the sealing metal beneath the head, particularly in the form shown in Fig. 3, is substantially uniform throughout from the inner edge of the depending peripheral skirt to the final tapered fillet which joins the shank. It will be understood that this type of nail might be used with any other sealing head arrangements shown in the earlier figures so that either form of nail proper might be associated with any of the sealing heads.

It will be realized that whereas I have herewith shown and described a practical operative device, nevertheless many changes might be made in the size, shape, number and disposition of parts without departing from the spirit of my invention and I wish, therefore, that my showing be taken as in a sense diagrammatic. In particular, while I have shown a smooth nail, the invention may be applied to a barbed nail, to a twisted nail, to a screw and to a driving screw and in fact it may be applied to almost any form of holding or attaching member, whether the latter is properly to be considered as a nail or a screw or a combination of them, and where in the specification and claims I have used the word "nail" I intend that it shall include in its meaning any and all such attaching or fastening parts.

The use and operation of my invention are as follows:

When the roofs, walls or partitions of this invention are to be made, one or more structural members such as the member C³ are put into position and the sheathing is applied to the structure so formed. The sheathing is generally metallic and usually in the form of galvanized and corrugated sheets. These will be perforated either by the use of some tool or directly by the nail as it is driven. However perforated and wherever the perforations may be located, once they have been formed the nail is driven through until its head comes into sealing contact to seal the perforation, as shown particularly in Figure 2. With the nail in the form shown, where the sealing head is distinctly below the upper level of the nail or driving head, the initial driving blows are struck entirely upon the head of the nail proper and not upon the sealing head and thus there is no danger of deforming or destroying or in any way injuring the sealing head. As the nailing progresses the sealing head comes in contact with the sheathing and flows and is driven into the perforation and comes into contact with the sheathing as shown particularly in Figure 2. As this driving is carried on the entire sealing head may be somewhat changed in shape so that the nail head may be driven more or less down into it. No contact of the hammer with the sealing head which may occur at this stage of the driving is damaging because the sealing head has already come into contact with the upper surface of the sheathing and has been properly spaced and positioned with respect to the perforation so that when the nail is driven finally home, whether or not it may be driven so far as to sink more or less into the softer metal of the sealing head, the latter will not be displaced or broken.

Thus by this construction a satisfactory nail is produced and yet the relatively soft and more easily distorted or broken sealing head is protected from the blows of the hammer during the early stages of driving and is only liable to be struck by the hammer during the final driving home when this contact of the hammer with the sealing head cannot damage it.

Depending upon the size of the perforation, the size of the nail and the force with which it is driven home, some of the lead may actually penetrate between the walls of the perforation and the shank of the nail, as shown at C⁴ in Figure 2. The seal of the perforation at this point will be complete, whether or not this occurs, but under some circumstances the lead will be driven or carried into the perforation so that between the walls of the perforation and the shank of the nail there is formed a thin annular body of the sealing material and when this takes place, the perforation is thus sealed from end to end and the nail itself may not be in contact with the walls of the perforation at any point.

I claim:

1. A sealing nail formed of a shank and an integral, laterally extending driving head, the shank at the point of juncture with the head being curved outwardly and upwardly to provide a tapered fillet portion adjacent the under side of the head, a sealing head of material softer than the driving head, permanently attached to the nail, positioned about the shank and beneath the driving head, the sealing head adjacent the shank being of substantially the same contour as the undersurface of the driving head and substantially parallel thereto.

2. In combination in a nail, a shank and a laterally extending head, the shank at the point of juncture with the head being curved outwardly and upwardly to provide a tapered fillet portion adjacent the underside of the head, the head extending laterally beyond said tapered juncture portion an appreciable amount and concentrically with respect to the shank, beneath the head and formed of material softer than the nail and the nail head, the upper surface of the nail head being above the upper surface of the sealing head, the sealing head having a downwardly depending portion adjacent the nail shank, the contour of the undersurface of the downwardly depending portion being substantially the same as the undersurface of the nail head proper, the sealing head provided with a peripheral, downwardly depending sealing skirt, the thickness of the sealing portion beneath the head and beyond said tapered juncture portion being substantially uniform throughout.

ALBERT J. DENISTON, JR.